United States Patent  (10) Patent No.: US 9,230,508 B2
Tam et al.  (45) Date of Patent: Jan. 5, 2016

(54) EFFICIENT FEEDBACK-BASED ILLUMINATION AND SCATTER CULLING

(71) Applicant: Pixar, Emeryville, CA (US)

(72) Inventors: Renee Tam, Emeryville, CA (US); Bill Reeves, Berkeley, CA (US); Justin Ritter, Kensington, CA (US)

(73) Assignee: Pixar, Emeryville, CA (US)

( * ) Notice: Subject to any disclaimer, the term of this patent is extended or adjusted under 35 U.S.C. 154(b) by 254 days.

(21) Appl. No.: 13/928,296

(22) Filed: Jun. 26, 2013

(65) Prior Publication Data

US 2014/0002476 A1 Jan. 2, 2014

Related U.S. Application Data

(60) Provisional application No. 61/665,114, filed on Jun. 27, 2012.

(51) Int. Cl.
*G09G 5/02* (2006.01)
*G06T 15/50* (2011.01)

(52) U.S. Cl.
CPC ............... *G09G 5/02* (2013.01); *G06T 15/506* (2013.01); *G06T 2210/56* (2013.01)

(58) Field of Classification Search
None
See application file for complete search history.

(56) References Cited

U.S. PATENT DOCUMENTS

2004/0070565 A1* 4/2004 Nayar et al. .................. 345/156

* cited by examiner

*Primary Examiner* — Yingchun He
(74) *Attorney, Agent, or Firm* — Patterson + Sheridan, LLP (57) ABSTRACT

Techniques are disclosed for rendering graphics objects in a scene file. A first pixel is selected from a plurality of pixels that are associated with an image frame. A set of graphics objects that intersect with the first pixel is identified. For each graphics objects in the first set of graphics objects. a set of light sources that illuminates the respective graphics object at the first pixel is identified, and, for each light source in the set of light sources, an entry is stored in a first table that includes references to the first pixel, the respective graphics object, and the respective light source.

20 Claims, 10 Drawing Sheets

| | Pixel Location | Graphics Object | Light Source | Value |
|---|---|---|---|---|
| 310(0) | 315(0) | 210(0) | 220(0) | 330(0) |
| 310(1) | 315(0) | 210(0) | 220(1) | 330(1) |
| 310(2) | 315(0) | 210(0) | 220(2) | 330(2) |
| 310(3) | 315(0) | 210(1) | 220(0) | 330(3) |
| 310(4) | 315(0) | 210(1) | 220(1) | 330(4) |
| 310(5) | 315(0) | 210(2) | 220(0) | 330(5) |
| 310(6) | 315(0) | 210(2) | 220(2) | 330(6) |
| 310(7) | 315(1) | 210(0) | 220(0) | 330(7) |

EFFICIENT FEEDBACK-BASED ILLUMINATION AND SCATTER CULLING

CROSS-REFERENCE TO RELATED APPLICATIONS

This application claims the priority benefit of U.S. provisional patent application entitled "EFFICIENT FEEDBACK-BASED ILLUMINATION AND SCATTER CULLING," Ser. No. 61/665,114, filed Jun. 27, 2012, which is hereby incorporated herein by reference.

BACKGROUND OF THE INVENTION

1. Field of the Invention

The present invention relates to the field of computer animation and, in particular, to efficient feedback-based illumination and scatter culling.

2. Description of the Related Art

Production of animated films often include complex geometric detail which give rise to very long render times for each rendered image frame. During a typical render, a small portion of a three-dimensional (3D) scene file description is visible in the final rendered image, as defined by the position and direction of a virtual camera that is directed at the 3D scene file. The scene file includes the set of graphics objects and light sources included in a 3D space.

Because only a small portion of a 3D scene file is visible in any given shot, a significant amount of render time may be spent on computing illumination of graphics objects by light sources that have minimal or no effect on the final rendered image. For example, a given shot of an animated film could use only a subset of the lights set up by sequence lighting, also referred to herein as master lighting, where master lighting defines all of the light sources used in a particular 3D scene file. Depending on the position and direction of the virtual camera, many lights defined during master lighting could be removed from a particular shot, where those light sources have little or no contribution to the visible surfaces in that shot. In one approach, such light sources may be manually removed from the scene file, and the scene file may be re-rendered to see if the removed light source had a negative impact on the final rendered image. However, removing light sources manually involves human interaction, which is tedious and not cost effective.

Likewise, a significant amount of render time may be spent in generating point cloud files associated with subsurface scatter effects that are not used by the final render. Subsurface scatter occurs where an object that is not directly visible in an image frame, nevertheless contributes to the rendered image. For example, one object may be covered by another object which is transparent or translucent. Objects not seen in an image frame may be removed via techniques involving hidden surface removal. Such techniques are typically insufficient, in that hidden surface removal does not account for subsurface scatter effects, where objects that are not visible in the rendered image frame, nevertheless contribute to one or more pixels in the rendered image frame. Removing hidden surfaces without accounting for subsurface scatter effects results in visual errors in the rendered image frame. As a result, render time is spent generating point cloud images for objects that have little or no visible impact on the final scene.

SUMMARY OF THE INVENTION

One embodiment of the present invention sets forth a method for rendering graphics objects in a scene file. The method includes selecting a first pixel from a plurality of pixels that are associated with an image frame. The method further includes identifying a first set of graphics objects that intersect with the first pixel. The method further includes, for each graphics objects in the first set of graphics objects, identifying a set of light sources that illuminates the respective graphics object at the first pixel, and for each light source in the set of light sources, storing an entry in a first table that includes references to the first pixel, the respective graphics object, and the respective light source.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention include efficient feedback-based illumination and scatter culling. In some embodiments, the objects within a scene may be rendered via a multi pass (e.g. two pass) system. During a first pass, the shader may determine and tabulate relationships between objects and light sources. Light sources that do not contribute to shading a particular object may be culled when that object is rendered during a second pass. In this manner, light sources may be deactivated on a per-object basis where such light sources do not illuminate a given object. Embodiments of the invention also include determining subsurface scatter input data that may be unused, and therefore does not contribute to the final scene. The shader may track point cloud files generated for each piece of geometry within a scene during a first pass, and may determine which point cloud files were not accessed during a second pass. Such point cloud files may be disabled in subsequent renders.

In one embodiment, light sources and point cloud files are culled where such light sources and point cloud files have little or no contribution to a given scene. As a result, render times are reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Hardware Overview

Figure 1:
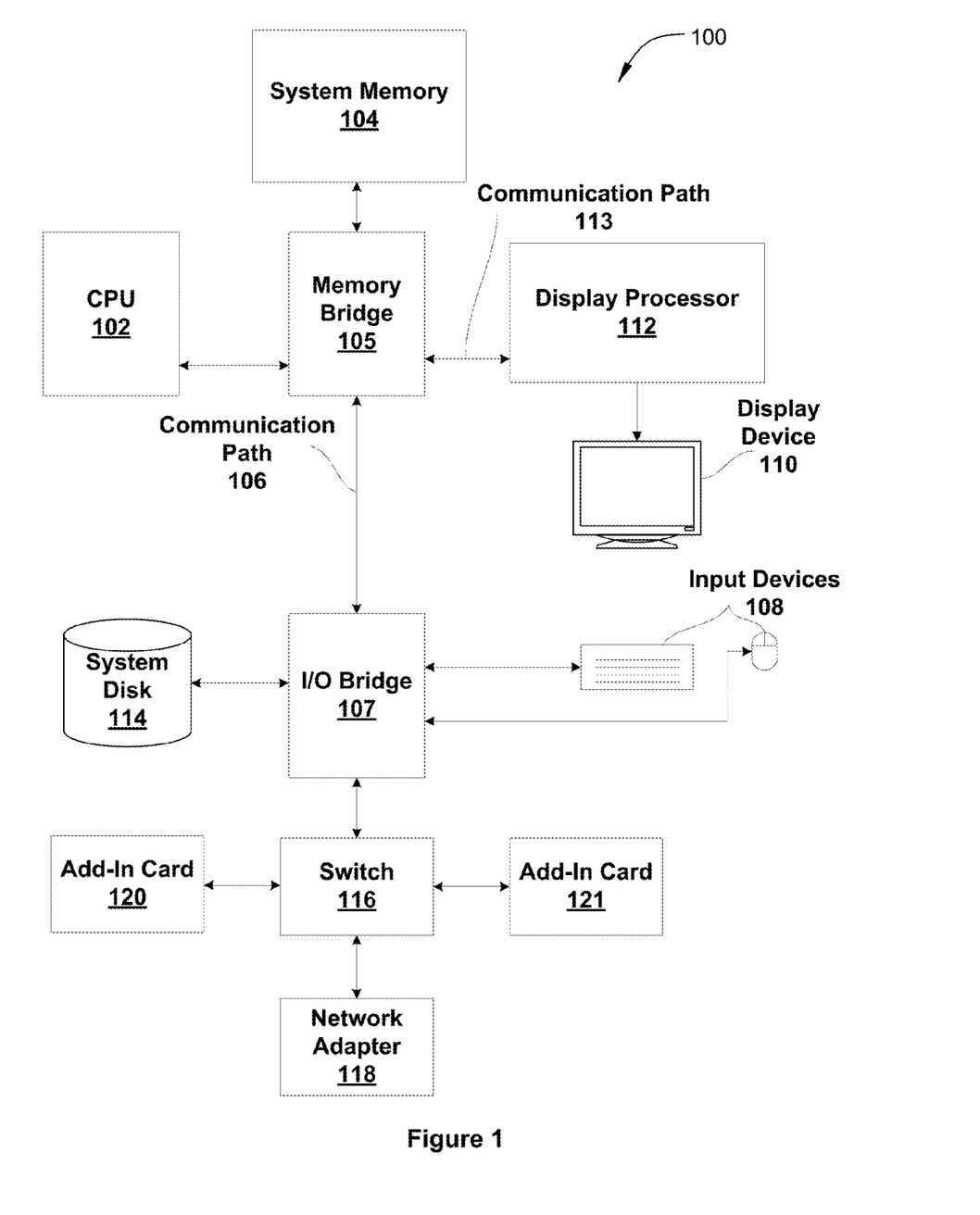
FIG. 1 is a block diagram of a system configured to implement one or more aspects of the invention.

FIG. 1 depicts one architecture of a system 100 within which embodiments of the present invention may be implemented. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs, in the case of stereoscopic images. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Illumination Loop Culling

Figure 2:
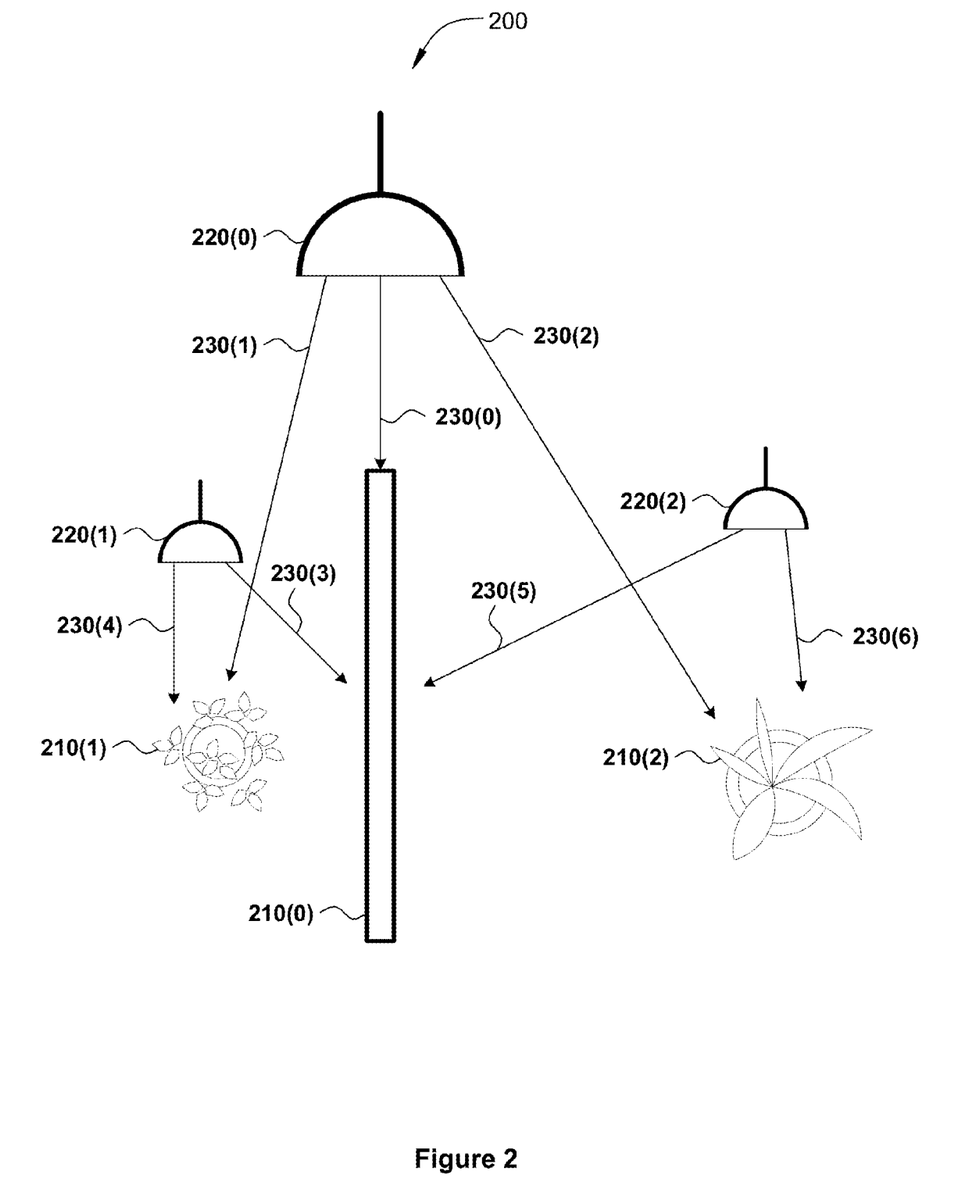
FIG. 2 illustrates a scene file, according to one embodiment of the invention.

FIG. 2 illustrates a scene file 200, according to one embodiment of the invention. As shown, the scene file 200 includes representative graphics objects 210, light sources 220, and light rays 230.

The graphics objects 210 represent 3D objects defined to exist within a 3D space. The graphics objects 210 are associated with various parameters, including, without limitation, size, position, color, and surface characteristics. As shown, the scene file 210 includes three graphics objects 210, with one graphics object 210(0) representing a wall and the other two graphics objects representing plants 210(1) 210(2). The graphics objects 210 are illuminated by one or more light sources 220.

Graphics objects 210 may be defined at any technically feasible level of detail. For example, a graphics object 210 could be defined as an entire complex object, such as a telephone. Alternatively, a graphic object 210 as a sub-object or component of a larger, more complex object, such as the housing, pushbuttons, handset, cord, and other components that make up a telephone. The level of detail for graphics objects 210 may be selected to optimize culling efficiency. For example, it could be more efficient to perform culling on the sub-objects or components of a telephone, rather than performing culling on the entire telephone.

The light sources 220 illuminate one or more graphics objects 210 in a scene file 200. The light sources 220 may be directional or ambient. Directional light sources cast light rays 230 in a particular direction. Ambient light sources cast light that illuminates the entire scene file, while not appear to come from a particular direction. Directional and ambient light sources may appear in any combination in a scene file 200. As shown, the three light sources 220 in the scene file are all directional light sources.

The light rays 230 represent a small exemplary set of light rays cast by the light sources 220. As shown, light source 220(0) casts three light rays 230(0), 230(1), 230(2). Light ray 230(0) strikes graphics object 210(0) indicating that light source 220(0) illuminates at least a portion of graphics object 210(0). Light ray 230(1) strikes graphics object 210(1) indicating that light source 220(0) also illuminates at least a portion of graphics object 210(1). Light ray 230(2) strikes graphics object 210(2) indicating that light source 220(0) illuminates at least a portion of graphics object 210(2) as well. Likewise, light source 220(1) casts two light rays 230(3) and 230(4). Light rays 230(3) and 230(4) strike graphics objects 210(0) and 210(1) respectively, indicating that light source 220(1) illuminates at least a portion of graphics objects 210 (0) and 210(1). Likewise, light source 220(2) casts two light rays 230(5) and 230(6). Light rays 230(5) and 230(6) strike graphics objects 210(0) and 210(2) respectively, indicating that light source 220(2) illuminates at least a portion of graphics objects 210(0) and 210(2).

Performance may be improved when rendering scene file 200 by identifying light sources 220 that may be culled without impacting the final rendered image. To identify such light sources, a culling application, further described herein, determines the set of light sources 220 that contribute to each graphics object 210, referred to herein as object-light pairings. This determination is made at each pixel location in the rendered image frame. Although this evaluation may be done using the standard surface shader associated with the rendering process, such an approach would incur performance cost. The standard shader performs numerous shading calculations, including shading calculations unrelated to determining which light sources 220 illuminate which graphics objects 210. Performance may be improved by substituting a custom shader for the standard shader, where the custom shader is optimized to determine the set of light sources 220 that contribute to each graphics object 210, but does not perform unrelated shading calculations.

The custom shader conservatively accounts for all surface lighting responses, without extra shading performance costs. This custom shader generates a table that includes the contributions of each light source to each object in a shot. From this table, the set of lights that can be safely culled for each object may be determined. The information in this table is then used to deactivate specific light sources per graphics object 210 during subsequent renders.

In some embodiments, the object-light pairings may be computed using the original standard surface shader, rather than with the custom shader, but at a reduced sample count, image resolution, or other quality-based parameter. Such an approach may result in improved image quality and accuracy with corresponding reductions in culling performance and data generation efficiency.

Figure 3:
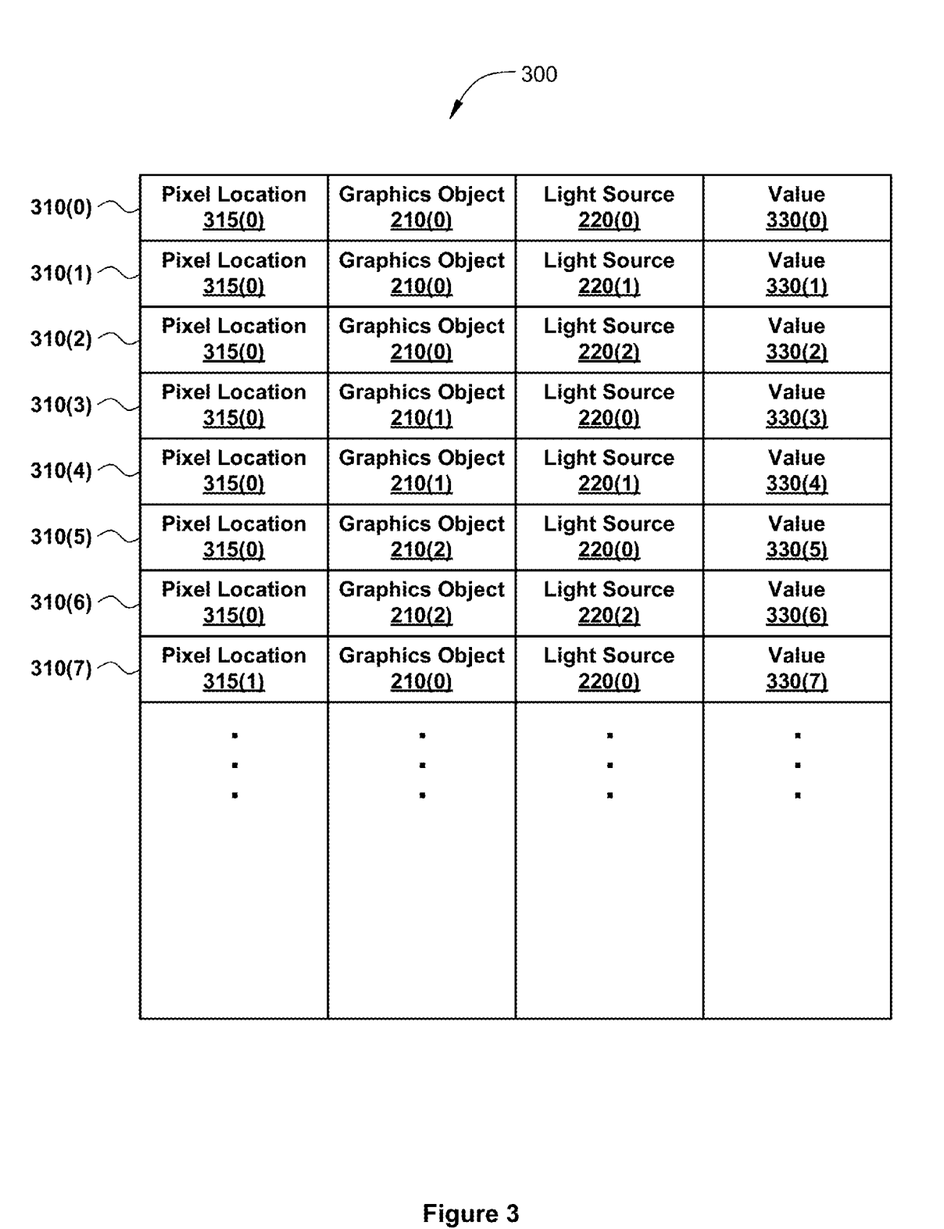
FIG. 3 illustrates an object-light pairing table, according to one embodiment of the invention.

FIG. 3 illustrates an object-light pairing table 300, according to one embodiment of the invention. As shown, the object-light pairing table 300 includes entries 310, where each entry indicates which light sources 220 illuminate graphics objects 210 at a given pixel location 315, referred to herein as an object-light pairing. In some embodiments, the entries 310 also include a value 330 indicate the amount of contribution that the object-light pair has at the given location 315.

The first three entries 310(0)-(2) indicate that graphics object 210(0) intersects with pixel location 315(0). The first entry 310(0) indicates that light source 220(0) illuminates graphics object 210(0) at pixel location 315(0) with contribution value 330(0). The second entry 310(1) indicates that light source 220(1) illuminates graphics object 210(0) at pixel location 315(0) with contribution value 330(1). The third entry 310(2) indicates that light source 220(2) illuminates graphics object 210(0) at pixel location 315(0) with contribution value 330(2).

Likewise, the next two entries 310(3)-(4) indicate that graphics object 210(1) intersects pixel location 315(0). Two light sources 220(0), 220(1) illuminate graphics object 210 (1) at pixel location 315(0) with contribution values 330(3), 330(4). Likewise, the next two entries 310(5)-(6) indicate that graphics object 210(2) intersects pixel location 315(0). Two light sources 220(0), 220(2) illuminate graphics object 210 (2) at pixel location 315(0) with contribution values 330(5), 330(6). The next entry 310(7) shows an object-light pairing associated with a different pixel location 315(1) involving graphics object 210(0), light source 220(0) and contribution value 330(7). When illumination loop culling concludes, the object-light pairing table 300 includes object-light pairings each pixel location 315 in the image frame.

In some embodiments, light sources 220 that contribute to the rendered image frame 410 may be culled where the contribution is below a threshold value. As described, the value 330 indicates the amount of contribution that the object-light pair has at the given location 315. Such a value 330 typically ranges between 0.0 and 1.0, although negative values and values exceeding 1.0 are possible. If the value 330 is below a threshold, such as 0.03, then the contribution of the object-light pair to the given pixel location may be negligible, and the light source 220 may be culled. The threshold may be any technically feasible value, and, in some embodiments, may be established by an end-user.

Scatter Culling

Figure 4:
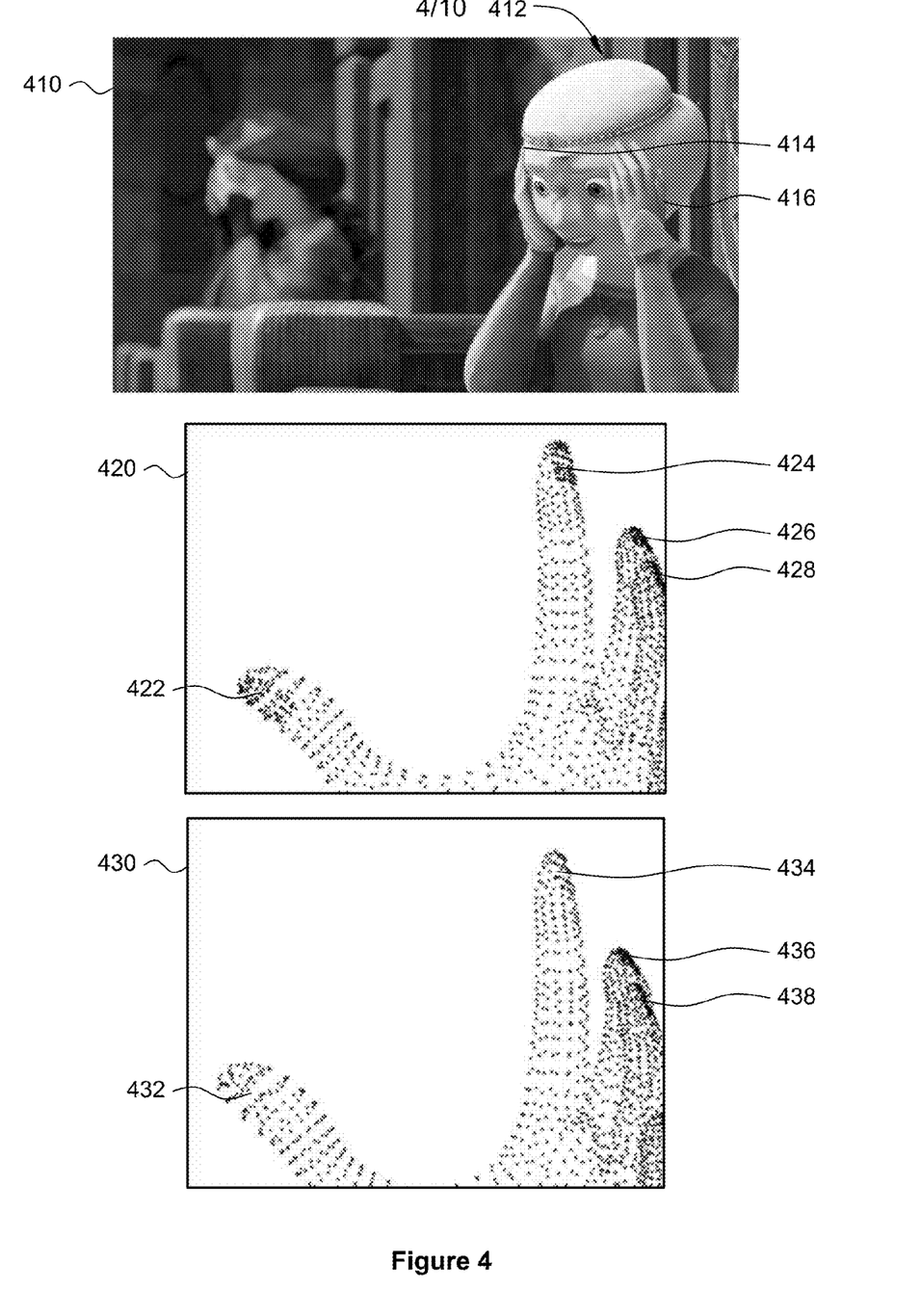
FIG. 4 is a group of images illustrating scatter culling, according to one embodiment of the invention.

FIG. 4 is a group of images illustrating scatter culling, according to one embodiment of the invention. As shown, the group of images includes a rendered image frame 410, a pre-cull point cloud image 420, and a post-cull point cloud image 430.

The rendered image frame 410 includes character 412. Portions of the right hand 414 of character 412 contribute to the rendered image frame 410, while other portions of the right hand 414 do not contribute to the rendered image frame 410. Likewise, portions of the left hand 416 of character 412 contribute to the rendered image frame 410, while other portions of the left hand 416 do not contribute to the rendered image frame 410.

The pre-cull point cloud image 420 illustrates a generated point cloud for the right hand 414 of character 412. As shown, the pre-cull point cloud image 420 includes point cloud images for the thumbnail 422 and three fingernails 424, 426, 428 of the right hand 414. In a particular rendered image frame 410, fingernails 426, 428 may contribute to the rendered image frame 410, while thumbnail 422 and fingernail 424 do not contribute to the rendered image frame 410.

Performance during rendering of the rendered image frame 410 may be improved by culling point cloud generating during the pre-pass render phase that are not used, or read, during the final render phase.

During the pre-pass render, the custom shader keeps stores the file names of the point cloud files that have been generated for each graphics object. During the final render, the custom shader stores the filenames for the point cloud files that were accessed for each pixel location in the rendered image frame 410. Point cloud files generated during the pre-pass render but not accessed during the final render may be disabled in subsequent pre-pass renders.

The post-cull point cloud image 430 illustrates a generated point cloud for the right hand 414 of character 412. As shown, the post-cull point cloud image 430 includes point cloud images for two fingernails 436, 438 of the right hand 414. Regions 432, 434 illustrate that the point cloud images for thumbnail 422 and fingernail 424 are removed from the post-cull point cloud image 420 because thumbnail 422 and fingernail 424 do not contribute to the rendered image frame 410.

Figure 5:
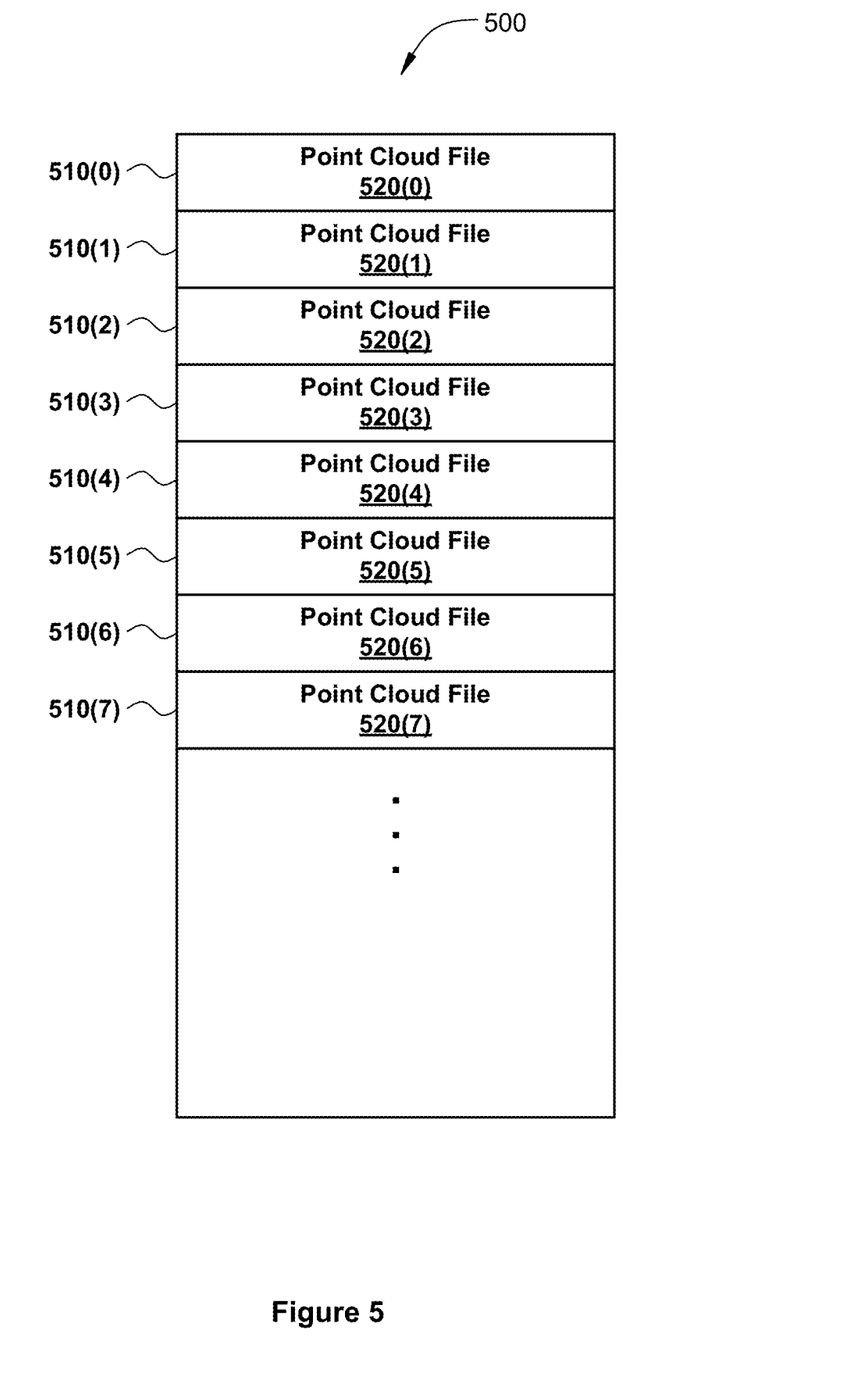
FIG. 5 illustrates a generated point cloud file table, according to one embodiment of the invention.

FIG. 5 illustrates a generated point cloud file table 500, according to one embodiment of the invention. As shown, the generated point cloud file table 500 includes entries 510, where each entry indicates a point cloud file that was generated during the pre-pass render pass.

The generated point cloud files may be at any level of a graphics object hierarchy. For example, entry 510(0) could include a filename for point cloud file 520(0), where point cloud file 520(0) could correspond to the character 412 of FIG. 4. Entry 510(1) could include a filename for point cloud file 520(1), where point cloud file 520(1) could correspond to the right arm of character 412. Entry 510(2) could include a filename for point cloud file 520(2), where point cloud file 520(2) could correspond to the right hand of character 412. Entries 510(3)-510(7) could include a filename for point cloud files 520(3)-510(7), where point cloud file 520(3)-510(7) could correspond to the thumbnail and four fingernails of the right hand of character 412.

Figure 6:
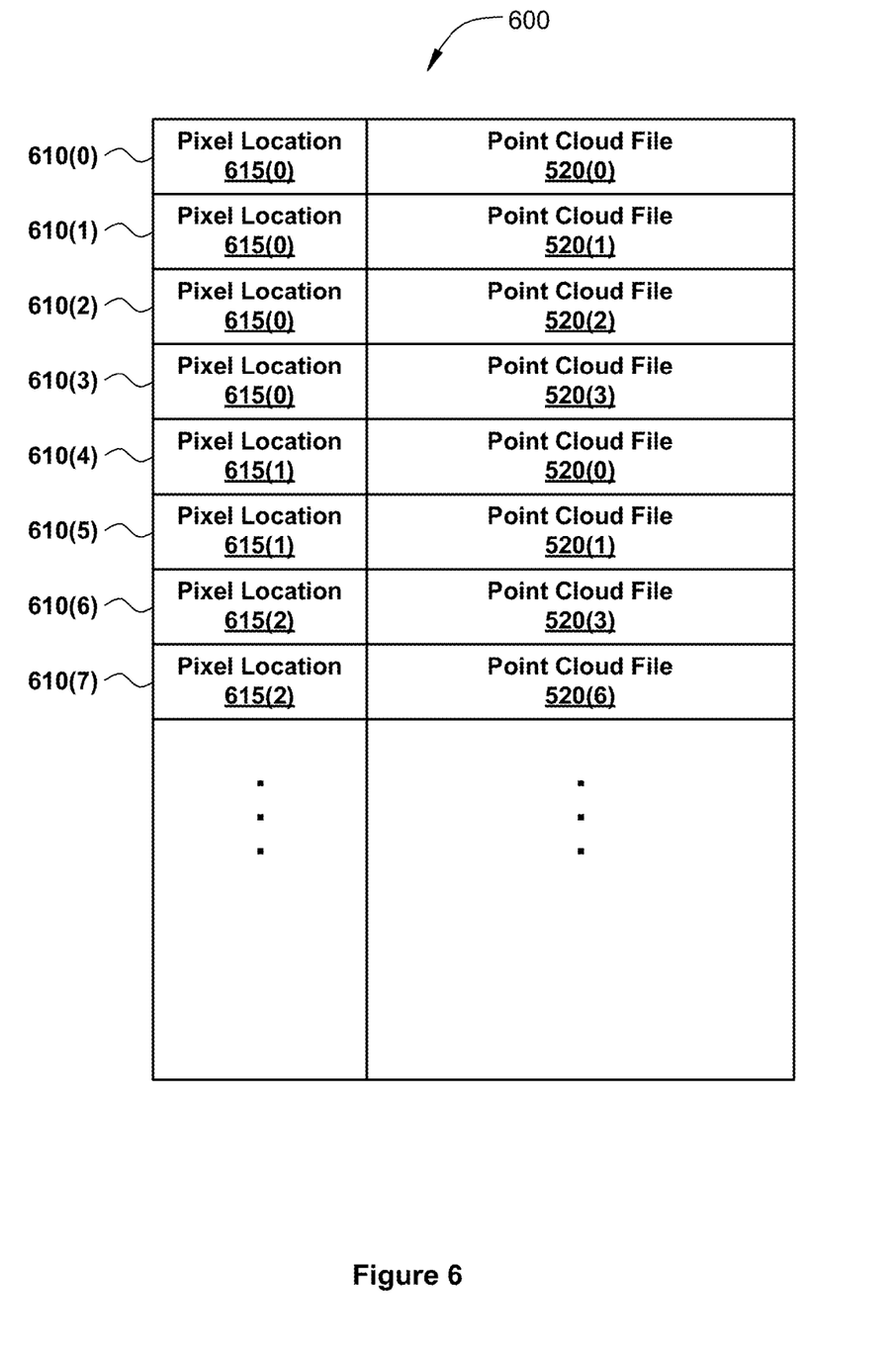
FIG. 6 illustrates a used point cloud file table, according to one embodiment of the invention.

FIG. 6 illustrates a used point cloud file table 600, according to one embodiment of the invention. As shown, the used point cloud file table 600 includes entries 610, where each entry indicates a point cloud file that was used, that is, read, during the final render pass.

Entry 610(0) indicates that point cloud file 520(0) was read during final rendering of pixel location 615(0). Likewise, entries 610(1)-610(3) indicates that point cloud files 510(1)-510(3) were also read during rendering of pixel location 615(0). Entries 610(4)-610(5) indicates that point cloud files 510(0), 510(1) were read during rendering of pixel location 615(1). Entries 610(6)-610(7) indicates that point cloud files 510(3), 510(6) were read during rendering of pixel location 615(2). At the conclusion of the final render, the used point cloud file table 600 includes the set of point cloud files 510 that were read for each pixel location 615 in the rendered image frame 410. Point cloud files appearing in the generated point cloud file table 500 but not in the used point cloud file table 600 may be disabled for following pre-pass renders. Such point cloud files 520 were generated during the pre-pass render, but were not read for any pixel location 615 in the final render. Accordingly, these point cloud files do not contribute to any pixel in the rendered image frame 410. As such, disabling these point cloud files for future pre-pass renders does not impact the rendered image frame 410, and time is not wasted in subsequent pre-pass renders generating the unused point cloud files.

Figure 7:
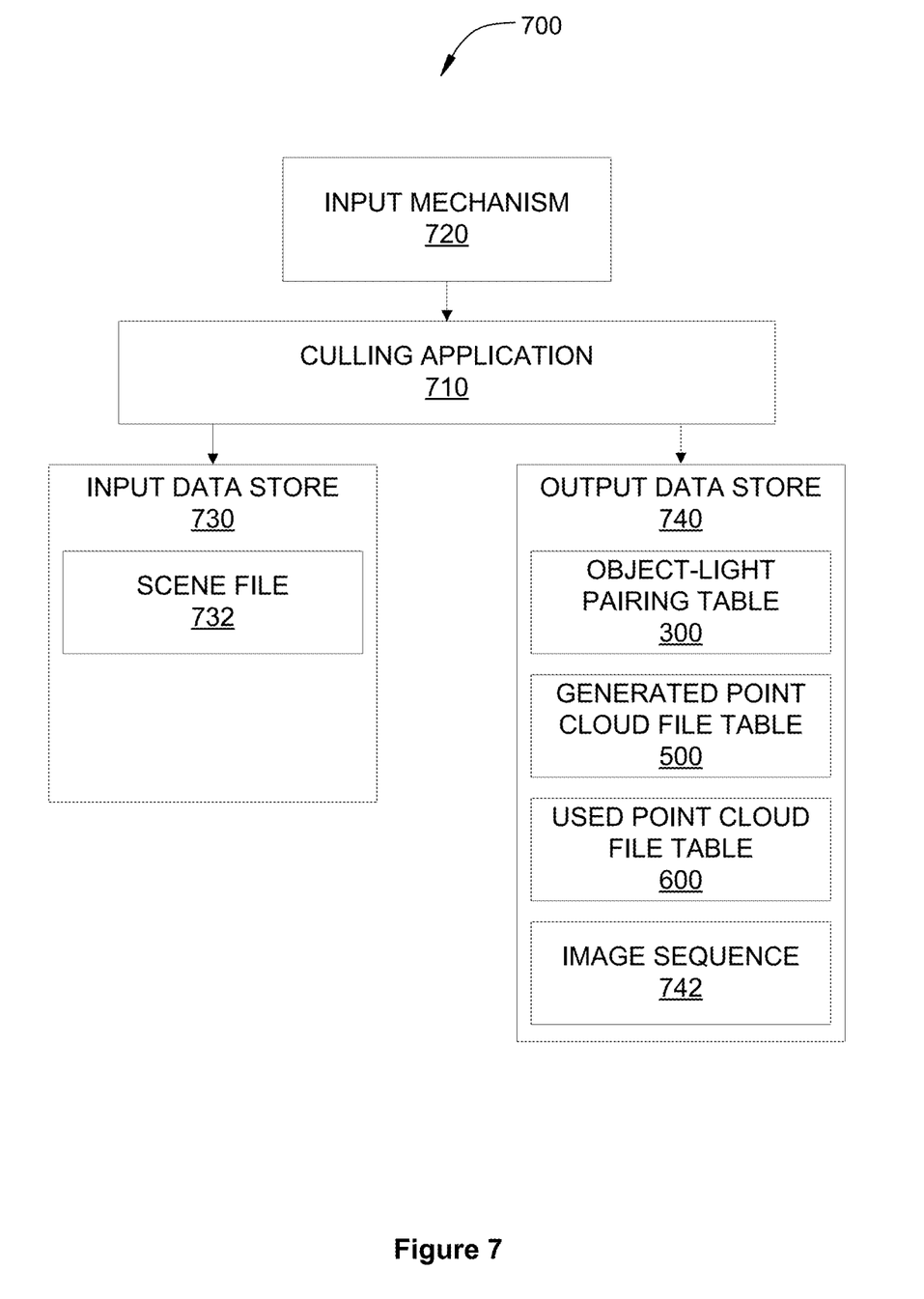
FIG. 7 illustrates a feedback-based illumination and scatter culling system as may be implemented on the computing system of FIG. 1, according to one embodiment of the invention.

FIG. 7 illustrates a feedback-based illumination and scatter culling system 700 as may be implemented on the computing system of FIG. 1, according to one embodiment of the invention.

As shown, the feedback-based illumination and scatter culling system 700 includes a feedback-based illumination and scatter culling application 710 (referred to hereinafter as a "culling application"), an input mechanism 720, an input data store 730, and an output data store 740.

The culling application 710 is a software program including instructions that, when executed, performs the techniques described above in conjunction with FIGS. 2-6. The culling application 710 may reside in system memory 104 where the instructions of the software program may be retrieved and executed by the CPU 102.

The input mechanism 720 receives one or more input variables and transmits the one or more input variables to the culling application 710. For example, the input mechanism 720 could receive a command to begin rendering an image sequence 742 for a scene file 732 from a particular starting image frame to a particular ending image frame. The input mechanism 720 may provide data to the culling application 710 via one or more input devices 108 in conjunction a graphical user interface, a command line interface, or via a script file configured for automatic execution.

The input data store 730 provides input data to the culling application 710. As shown, the input data store 730 includes a scene file 732. The scene file 732 includes descriptions of graphics objects and light sources in a 3D space. For example, the scene file 732 could include a description of graphics objects along with various associated parameters, including, without limitation, size, position, color, and surface characteristics. The scene file 732 could include a description of light sources. The scene file 732 could also include the position, direction, and zoom level of a virtual camera, where the virtual camera determines the set of objects and light sources that are visible in the rendered image frames of the image sequence 742.

The input data store 730 may also include any other input information for the culling application 710 including, without limitation, script files (not shown) defining automatic execution of the culling application 710 to render one or more scene files 732. The input data store 730 may be located within the system disk 114.

The output data store 740 provides output data from the culling application 710 for storage or display. As shown, the output data store 740 includes an object-light pairing table 300, a generated point cloud file table 500, a used point cloud file table 600, and an image sequence 742.

The object-light pairing table 300 includes entries 310, where each entry indicates which light sources 220 illuminate graphics objects 210 at a given pixel location, as described herein in conjunction with FIG. 3. The generated point cloud file table 500 includes entries 510, where each entry indicates a point cloud file that was generated during the pre-pass render pass, as described herein in conjunction with FIG. 5. The used point cloud file table 600 includes entries 610, where each entry indicates a point cloud file that was used, that is, read, during the final render pass, as described herein in conjunction with FIG. 6.

The image sequence 742 includes a series of image frames produced by the culling application 710, where each image frame includes a rendered image showing the graphics objects illuminated by one or more light sources as rendered by the culling application 710. The image frames in the image sequence 742 may be displayed on the display device 110 to view the crowd of characters in motion over time.

The output data store 740 may also include any other output information for the culling application 710 including, without limitation, a list of point cloud files (not shown) that were generated, but not used, during a previous render. The output data store 740 may be located within the system disk 114. Alternatively, the output data store 740 may be located within a memory in a format suitable for display on the display device 110.

Figure 8A:
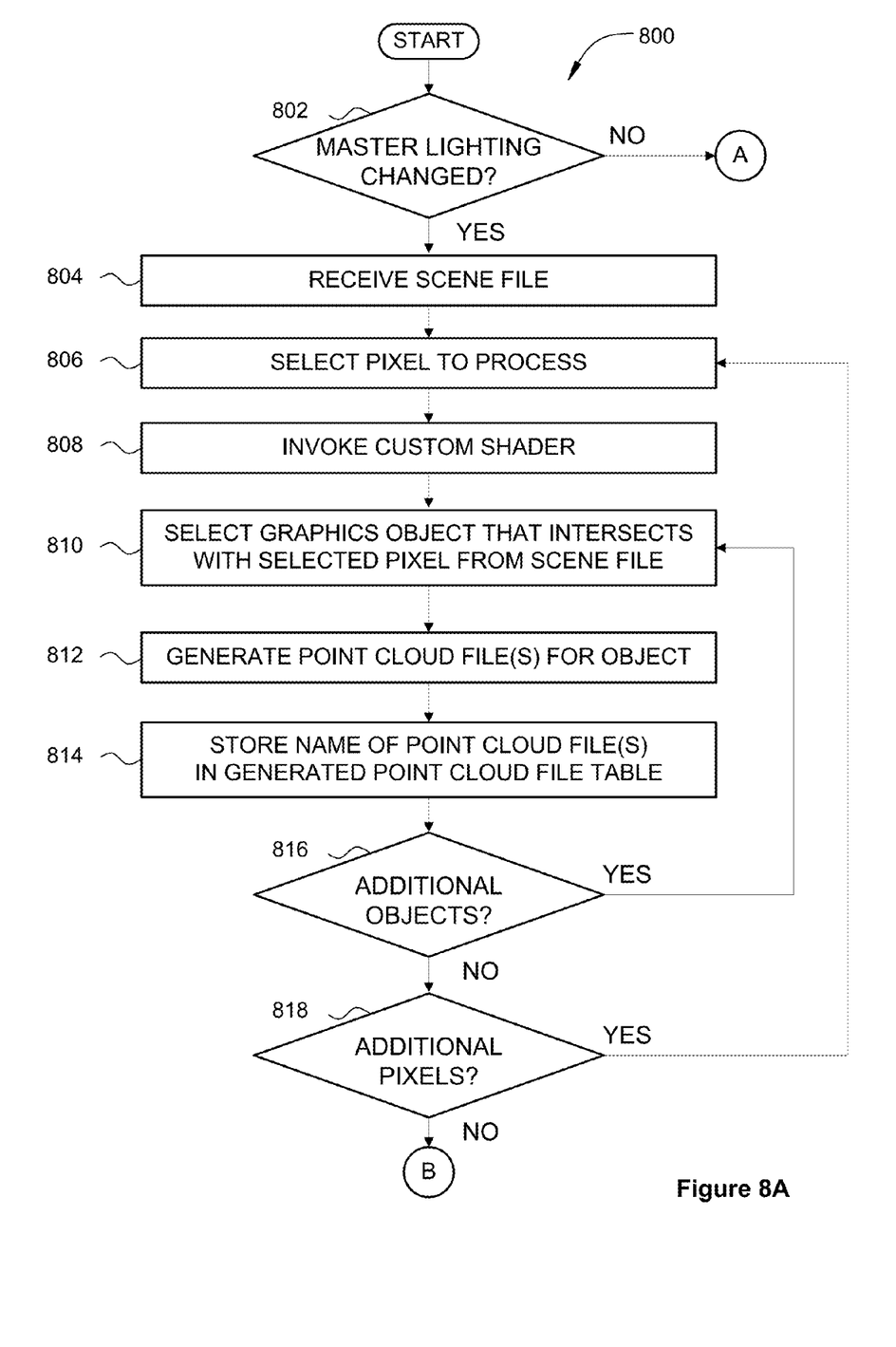
FIGS. 8A-8C set forth a flow diagram of method steps for feedback-based illumination and scatter culling with the system of FIG. 7, according to one embodiment of the invention.
Figure 8B:
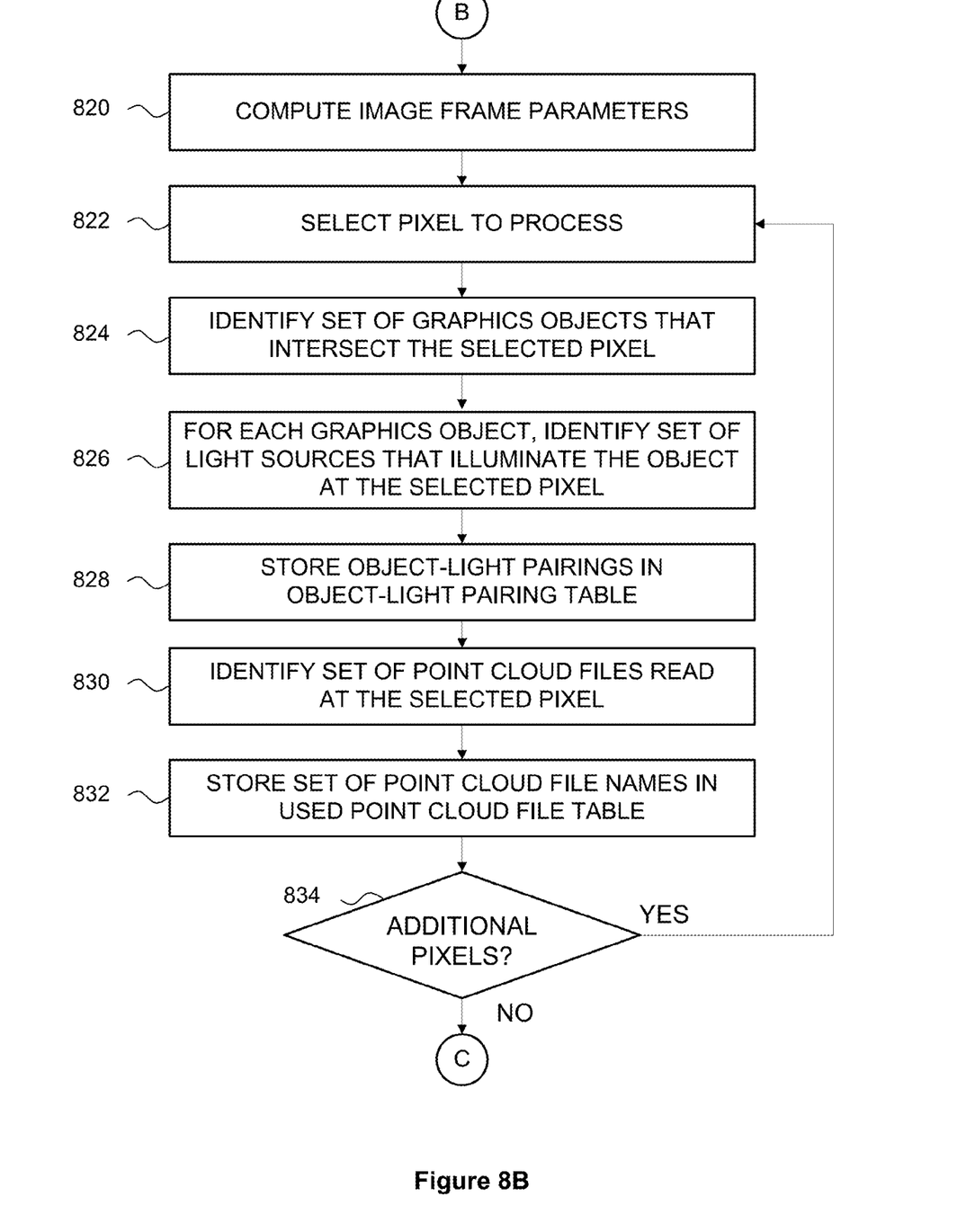
Figure 8C:
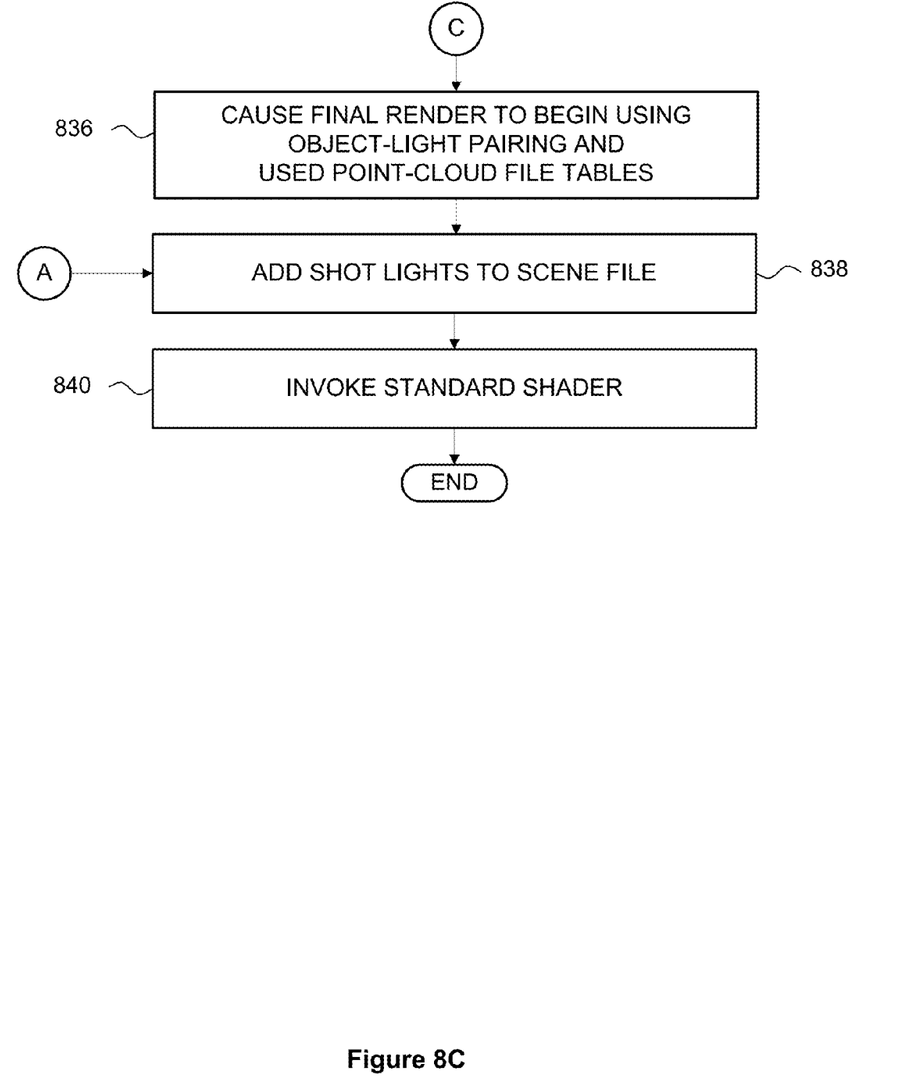

FIGS. 8A-8C set forth a flow diagram of method steps for feedback-based illumination and scatter culling with the system of FIG. 7, according to one embodiment of the invention. Although the method steps are described in conjunction with the systems of FIGS. 1 and 7, persons skilled in the art will understand that any system configured to perform the method steps, in any order, falls within the scope of the present invention.

A method 800 begins at step 802, where the culling application 710 determines whether master lighting has changed. If the master lighting has changed, then the method 800 proceeds to step 804, where the culling application 710 receives a scene file 732 including three-dimensional lights and graphics objects. At step 806, the culling application 710 selects a pixel associated with the final rendered image frame for processing. At step 808, the culling application 710 invokes a custom shader configured to perform the techniques described herein. At step 810, where the culling application 710 selects a graphics object from the scene file 732 that intersects with the selected pixel. At step 812, the culling application 710 generates one or more point cloud files associated with the selected graphics object. At step 814, the culling application 710 stores the name of the generated point cloud files in the generated point cloud file table 500.

At step 816, the culling application 710 determines whether the scene file 732 includes additional graphics objects for processing, where the graphics objects intersect with the selected pixel. If the scene file 732 includes additional graphics objects for processing, then the method 800 proceeds to step 808, described above. If at step 816, however, the scene file 732 does not include additional graphics objects for processing, then the method 800 proceeds to step 818, where the culling application 710 determines whether the image frame includes additional pixels for processing. If the image frame includes additional pixels for processing, then the method 800 proceeds to step 806, described above.

If at step 818, however, the image frame does not include additional pixels for processing, then the method 800 proceeds to step 820, where the culling application 710 computes the image frame parameters. For example, the culling application 710 could compute the size and position of an image to be rendered for display. At step 822, the culling application 710 selects a pixel associated with the final rendered image frame for processing. At step 824, the culling application 710 identifies the set of graphics objects that intersect with the selected pixel. At step 826, the culling application 710 identifies, for each graphics object in the set of graphics objects, the set of lights that illuminates the respective graphics object. At step 828, the culling application 710 stores the object-light pairs associated with the selected pixel in the object-light pairing table 300. In some embodiments, the culling application 710 also stores a value for each object-light pair that indicates the contribution of the object-light pair to the final rendered image.

At step 830, the culling application 710 identifies the set of point cloud files from the generated point cloud file table 500 that are read in conjunction with the selected pixel. At step 832, the culling application 710 stores the set of point cloud files associated with the selected pixel into the used point cloud file table 600. At step 834, the culling application 710 determines whether the image frame includes additional pixels for processing. If the image frame includes additional pixels for processing, then the method 800 proceeds to step 822, described above.

If at step 834, however, the image frame does not include additional pixels for processing, then the method 800 proceeds to step 836, where the culling application 710 causes the final render to begin, where the final render utilizes the data computed by the culling application 710 that have been stored in the object-light pairing table 300 and the used point cloud file table 600. In some embodiments, the final render pass does not render object-light pairs where the associated value is below a threshold level. At step 838, the culling application 710 adds any shot lights that correspond to the current shot, where the shot lights are not in the master lighting group. At step 840, the culling application 710 invokes the standard shader to prepare for the final rendering pass with any added shot lights. The method 800 then terminates.

Returning to step 802, if the master lighting has not changed, then the method 800 proceeds to step 838, described above.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method of rendering graphics objects in a scene file, the method comprising:
   selecting a first pixel from a plurality of pixels that are associated with an image frame;
   identifying a first set of graphics objects that intersect with the first pixel; and
   for each graphics objects in the first set of graphics objects:
      identifying a set of light sources that illuminates the respective graphics object at the first pixel, and
      for each light source in the set of light sources, storing an entry in a first table that includes references to the first pixel, the respective graphics object, and the respective light source.

2. The method of claim 1, further comprising:
   identifying one or more entries in the first table that are associated with the first pixel; and
   rendering the first pixel based on the one or more entries.

3. The method of claim 1, wherein the entry in the first table further includes a value associated with a contribution level of the respective light source and graphics object at the first pixel.

4. The method of claim 3, further comprising:
identifying one or more entries in the first table that are associated with the first pixel, wherein the value associated with each entry of one or more entries exceeds a threshold; and
rendering the first pixel based on the one or more entries.

5. The method of claim 1, further comprising:
generating a first set of point cloud files that are associated with the first set of graphics objects;
for each point cloud file in the first set of point cloud files, storing an entry in a second table that includes a reference to the respective point cloud file.

6. The method of claim 5, further comprising:
identifying one or more point cloud files in the set of point cloud files that are accessed in association with the first pixel; and
for each point cloud file in the one or more point cloud files, storing an entry in a third table that includes references to the first pixel and the respective point cloud file.

7. The method of claim 1, further comprising:
generating a second set of point cloud files, where each point cloud file in the second set of point cloud files is associated with an entry in a third table.

8. The method of claim 1, further comprising storing an animation file on a computer-readable medium, wherein the animation file comprises an output of the selecting, identifying, and storing steps.

9. A non-transitory computer-readable medium including instructions that, when executed by a processing unit, cause the processing unit to render graphics objects in a scene file, by performing the steps of:
selecting a first pixel from a plurality of pixels that are associated with an image frame;
identifying a first set of graphics objects that intersect with the first pixel; and
for each graphics objects in the first set of graphics objects:
identifying a set of light sources that illuminates the respective graphics object at the first pixel, and
for each light source in the set of light sources, storing an entry in a first table that includes references to the first pixel, the respective graphics object, and the respective light source.

10. The non-transitory computer-readable medium of claim 9, further comprising:
identifying one or more entries in the first table that are associated with the first pixel; and
rendering the first pixel based on the one or more entries.

11. The non-transitory computer-readable medium of claim 9, wherein the entry in the first table further includes a value associated with a contribution level of the respective light source and graphics object at the first pixel.

12. The non-transitory computer-readable medium of claim 11, further comprising:
identifying one or more entries in the first table that are associated with the first pixel, wherein the value associated with each entry of one or more entries exceeds a threshold; and
rendering the first pixel based on the one or more entries.

13. The non-transitory computer-readable medium of claim 9, further comprising:
generating a first set of point cloud files that are associated with the first set of graphics objects;
for each point cloud file in the first set of point cloud files, storing an entry in a second table that includes a reference to the respective point cloud file.

14. The non-transitory computer-readable medium of claim 13, further comprising:
identifying one or more point cloud files in the set of point cloud files that are accessed in association with the first pixel; and
for each point cloud file in the one or more point cloud files, storing an entry in a third table that includes references to the first pixel and the respective point cloud file.

15. The non-transitory computer-readable medium of claim 9, further comprising:
generating a second set of point cloud files, where each point cloud file in the second set of point cloud files is associated with an entry in a third table.

16. A computing system, comprising:
a memory that is configured to store instructions for a program; and
a processor that is configured to execute the instructions for the program to render graphics objects in a scene file, by performing an operation comprising:
selecting a first pixel from a plurality of pixels that are associated with an image frame;
identifying a first set of graphics objects that intersect with the first pixel; and
for each graphics objects in the first set of graphics objects:
identifying a set of light sources that illuminates the respective graphics object at the first pixel, and
for each light source in the set of light sources, storing an entry in a first table that includes references to the first pixel, the respective graphics object, and the respective light source.

17. The computing system of claim 16, further comprising:
identifying one or more entries in the first table that are associated with the first pixel; and
rendering the first pixel based on the one or more entries.

18. The computing system of claim 16, wherein the entry in the first table further includes a value associated with a contribution level of the respective light source and graphics object at the first pixel.

19. The computing system of claim 18, further comprising:
identifying one or more entries in the first table that are associated with the first pixel, wherein the value associated with each entry of one or more entries exceeds a threshold; and
rendering the first pixel based on the one or more entries.

20. The computing system of claim 16, further comprising:
generating a first set of point cloud files that are associated with the first set of graphics objects;
for each point cloud file in the first set of point cloud files, storing an entry in a second table that includes a reference to the respective point cloud file.

* * * * *